United States Patent
Xu et al.

(10) Patent No.: US 11,748,108 B2
(45) Date of Patent: Sep. 5, 2023

(54) INSTRUCTION EXECUTING METHOD AND APPARATUS, ELECTRONIC DEVICE, AND COMPUTER-READABLE STORAGE MEDIUM

(71) Applicants: Beijing Baidu Netcom Science and Technology Co., Ltd., Beijing (CN); Kunlunxin Technology (Beijing) Company Limited, Beijing (CN)

(72) Inventors: Yingnan Xu, Beijing (CN); Jian Ouyang, Beijing (CN); Xueliang Du, Beijing (CN); Kang An, Beijing (CN)

(73) Assignees: Beijing Baidu Netcom Science and Technology Co., LTD., Beijing (CN); Kunlunxin Technology (Beijing) Company Limited, Beijing (CN)

( * ) Notice: Subject to any disclaimer, the term of this patent is extended or adjusted under 35 U.S.C. 154(b) by 0 days.

(21) Appl. No.: 17/210,616

(22) Filed: Mar. 24, 2021

(65) Prior Publication Data

US 2021/0271482 A1    Sep. 2, 2021

(30) Foreign Application Priority Data

Jul. 20, 2020   (CN) .......................... 202010699439.3

(51) Int. Cl.
G06F 9/38       (2018.01)
G06F 9/30       (2018.01)

(52) U.S. Cl.
CPC ........ G06F 9/3834 (2013.01); G06F 9/30087 (2013.01); G06F 9/3838 (2013.01)

(58) Field of Classification Search
CPC ... G06F 9/3838; G06F 9/3834; G06F 9/30087
See application file for complete search history.

(56) References Cited

U.S. PATENT DOCUMENTS 6,286,095 B1    9/2001  Morris et al.
6,871,273 B1 *  3/2005  Moore ................ G06F 9/30043
                                              712/E9.046
(Continued)

FOREIGN PATENT DOCUMENTS

CN    101770357    7/2010
CN    102420820    4/2012
(Continued)

OTHER PUBLICATIONS

EP21164336 Extended European Search Report and Search Opinion dated Oct. 6, 2021 (10 pages).
(Continued)

*Primary Examiner* — William B Partridge
(74) *Attorney, Agent, or Firm* — Amundsen Davis, LLC

(57) ABSTRACT

Example embodiments of the present application provide an instruction executing method and apparatus, an electronic device, and a computer-readable storage medium that may be applied in the field of artificial intelligence. The instruction executing method may include: executing an instruction sequence that includes memory instructions and non-memory instructions, the instructions in the sequence executed starting to be executed in order; determining that execution of a first memory instruction needs to be completed before a second memory instruction starts to be executed, the second memory instruction being a next memory instruction following the first memory instruction in the instruction sequence; and executing non-memory instructions between the first memory instruction and the second memory instruction without executing the second memory instruction, during a cycle of executing the first memory instruction.

14 Claims, 4 Drawing Sheets

(56) References Cited

U.S. PATENT DOCUMENTS

| | | | |
|---|---|---|---|
| 9,658,961 B2* | 5/2017 | Gschwind | G06F 12/084 |
| 2014/0215190 A1* | 7/2014 | Mylius | G06F 9/3836 |
| | | | 712/220 |
| 2015/0378915 A1* | 12/2015 | Gschwind | G06F 9/30087 |
| | | | 711/130 |
| 2016/0092223 A1 | 3/2016 | Wang et al. | |
| 2018/0188997 A1* | 7/2018 | Fleming, Jr. | G06F 9/3838 |
| 2019/0187990 A1 | 6/2019 | Smaus et al. | |
| 2019/0205140 A1 | 7/2019 | Grisenthwaite et al. | |

FOREIGN PATENT DOCUMENTS

| | | |
|---|---|---|
| CN | 107786374 | 3/2018 |
| CN | 108984319 | 12/2018 |
| CN | 109450670 | 3/2019 |
| JP | 2002251283 A | 9/2002 |
| KR | 19980702203 A | 7/1998 |
| WO | 2009119021 A1 | 10/2009 |

OTHER PUBLICATIONS

Communication Pursuant to Article 94(3) from the European Patent Office for Application No. 21164336.6 dated Jun. 29, 2022 (6 pages).
Office Action from the Japanese Patent Office for Application No. 2021-089687 dated Jun. 13, 2022 (8 pages).
Ohmssha Co,. Ltd., "IA-64 Processor Basic Course," document (Jan. 25, 2000)(5 pages, which includes a 1 page English abstract).
Communication Pursuant to Article 94(3) from the European Patent Office for Application No. 21164336.6 dated Dec. 19, 2022 (6 pages).
Decision of Rejection of the corresponding JP application No. 2021-089687 dated Dec. 26, 2022 (3 pages).
Jingman, Chi, IA-64 processor basic course, 1st Edition, Ohmsha Co.,, Aug. 25, 2000, (7 pages).
Notice of Allowance for Korean Application No. 10-2021-0038060 dated Apr. 27, 2023 (3 pages).

* cited by examiner

INSTRUCTION EXECUTING METHOD AND APPARATUS, ELECTRONIC DEVICE, AND COMPUTER-READABLE STORAGE MEDIUM

CROSS-REFERENCE TO RELATED APPLICATION

This application claims priority to Chinese patent application No. 202010699439.3, filed on Jul. 20, 2020, which is hereby incorporated by reference in its entirety.

TECHNICAL FIELD

The present application relates to a computer technology, and more particularly, relates to an instruction executing method and apparatus, an electronic device, and a computer-readable storage medium, which may be applied in the field of artificial intelligence.

BACKGROUND

Memory models, which may be indived into memory models of hardware level and language memory models, ensure an access order and a program order by defining specifications required by hardware design or programming, and thus ensure the correctness of the execution of programs. Conventional processors, as well as advanced languages such as C++ and the like, support memory models. The major memory models include order consistency models, full memory ordering models, loose memory models and the like, where the loose memory models are most friendly to performance. For emerging artificial intelligence processors and corresponding programming languages, there is also a need to define and support memory models with respect to them. Artificial intelligence processors are a class of domain-specific processors. The biggest change in a memory architecture designed for the features of the artificial intelligence field, lies in using a scratchpad memory to replace a cache in the conventional processor, so that programmers can directly manage the storage of data.

SUMMARY

In accordance with embodiments of the present application, an instruction executing method and apparatus, an electronic device, and a computer-readable storage medium are provided.

In a first aspect of the present application, an instruction executing method is provided, which may include: executing an instruction sequence, the instruction sequence comprising memory instructions and non-memory instructions, the instructions in the instruction sequence starting to be executed in order; determining that execution of a first memory instruction needs to be completed before a second memory instruction starts to be executed, the second memory instruction being a next memory instruction following the first memory instruction in the instruction sequence; and executing non-memory instructions between the first memory instruction and the second memory instruction without executing the second memory instruction, during a cycle of executing the first memory instruction.

In a second aspect of the present application, an instruction executing apparatus is provided, which may include: an instruction sequence executing module configured for executing an instruction sequence, the instruction sequence comprising memory instructions and non-memory instructions, the instructions in the instruction sequence starting to be executed in order; an execution determining module configured for determining that execution of a first memory instruction needs to be completed before a second memory instruction starts to be executed, the second memory instruction being a next memory instruction following the first memory instruction in the instruction sequence; and a non-memory instruction executing module configured for executing non-memory instructions between the first memory instruction and the second memory instruction without executing the second memory instruction, during a cycle of executing the first memory instruction.

In a third aspect of the present application, an electronic device is provided, which may include: at least one processor; and a memory communicatively connected to the at least one processor; wherein, the memory stores instructions executable by the at least one processor, the instructions being executed by the at least one processor to enable the at least one processor to execute the method according to the first aspect of the present application.

In a fourth aspect of the present application, a non-transitory computer-readable storage medium storing computer instructions is provided, wherein the computer instructions cause a computer to perform the method according to the first aspect of the present application.

It should be understood that what is described in the Summary section is not intended to limit the key or critical features of the embodiments of the present application, nor is it intended to limit the scope of the present application. Other features of the present application will become readily apparent from the following description.

BRIEF DESCRIPTION OF THE DRAWINGS

The foregoing and other objects, features and advantages of the present application will become more apparent through more detailed descriptions of exemplary embodiments of the present application taken in combination with the drawings, wherein like reference numerals generally represent like parts throughout the exemplary embodiments of the present application. It should be understood that the drawings are included to provide a better understanding of the present application and are not to be construed as limiting the present application. In the drawings.

Throughout the drawings, the same or corresponding reference numerals represent the same or corresponding parts.

DETAILED DESCRIPTION

Figure 1:
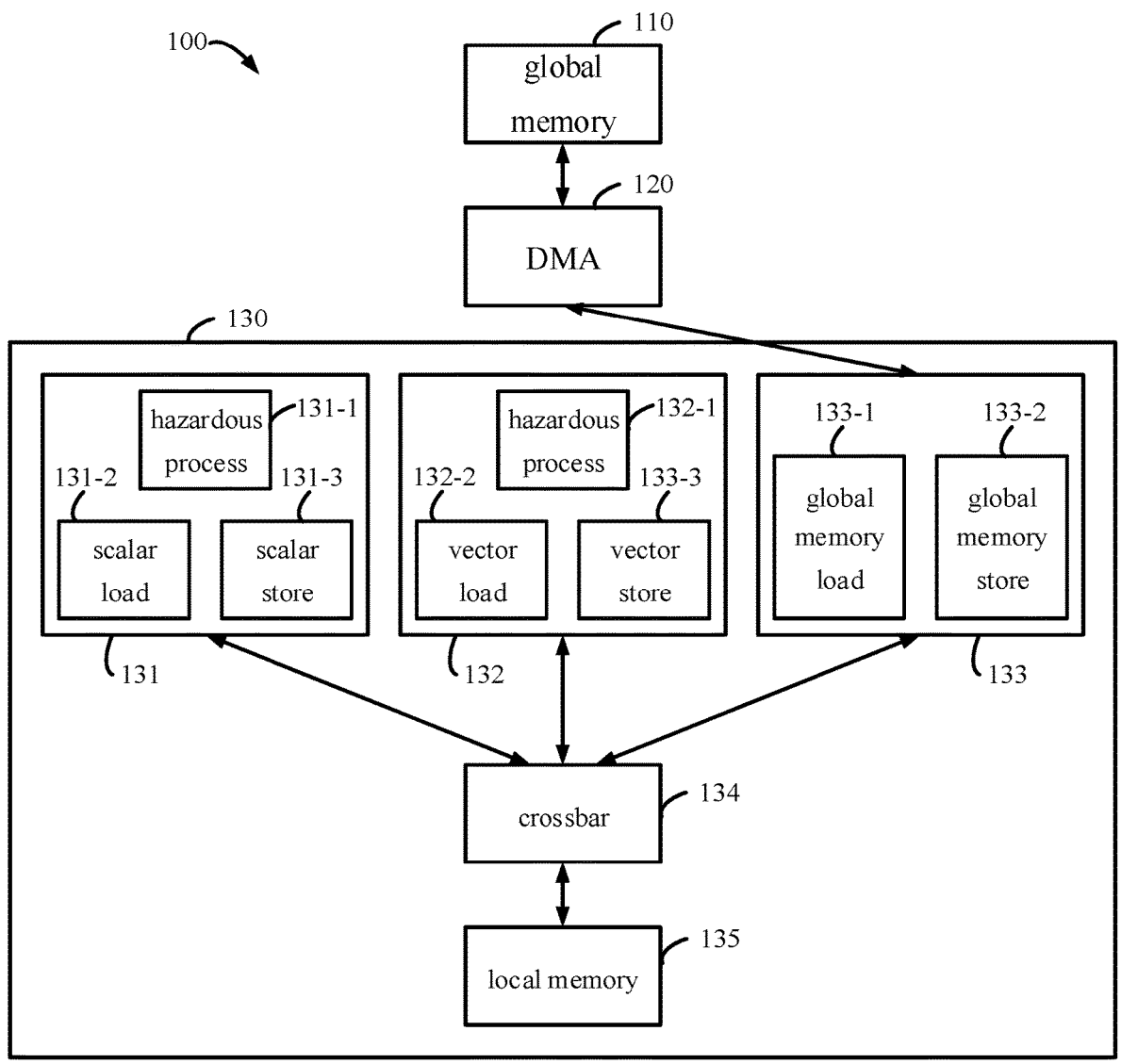
FIG. 1 is a schematic diagram of an instruction executing system 100 in which instruction executing methods according to some exemplary embodiments of the present application may be implemented.

Preferred embodiments of the present application will be described in more detail below with reference to the drawings. Although the preferred embodiments of the present application are shown in the drawings, it should be understood that the present application may be implemented in various forms and should not be limited to the embodiments set forth herein. Rather, these embodiments are provided so that the present application will be thorough and complete, and will fully convey the scope of the present application to those skilled in the art.

As used herein, the term "comprising" and variations thereof are meant to be inclusive, i.e., "including, but not limited to". The term "or" means "and/or", unless specifically stated otherwise. The term "based on" means "based at least in part on". The terms "one example embodiment" and "one embodiment" mean "at least one example embodiment". The term "another embodiment" means "at least one further embodiment". The terms "first", "second" and the like may refer to different or the same objects. Other explicit and implicit definitions are also possible below.

In a scenario of artificial intelligence application, the locality of memory access with respect to the conventional processor is inferior, in which case the performance improvement brought by the cache is not obvious, on the contrary, the performance would be degraded in a data-throwaway scenario. Meanwhile, the complexity and resource occupancy of the cache are very high. In contrast, it is more reasonable to remove the cache to obtain more hardware resource area for the increase in computational power, thus many artificial intelligence processors adopt a cache-less scratchpad memory structure at present. Upon adopting the scratchpad memory, the memory is managed primarily by software programmers, and conventional processor-implemented memory model systems and methods may not be fully applicable to most artificial intelligences due to differences in the architecture and programming languages.

As described above in the Background, the cache is more suitable where the memory content is used for a plurality of times, but in a scenario of artificial intelligence application where the use of data may be little and possibly even only once, a scratchpad memory is more applicable, with the two kinds of memories being implemented differently. Thus, memory model systems and methods implemented using conventional processors are not fully adaptable to, for example, the scratchpad memory used in artificial intelligence processors. For example, in conventional processors, the storage of instructions and data is not visible to programmers due to the presence of the cache. As a result, to implement a loose memory model, relevant program correctness is handled by a compiler.

When a processor executes an instruction sequence, instructions in the instruction sequence start to be executed in order. However, the processor does not necessarily have to start execution of a next instruction after execution of each instruction is completed, but may, for example, execute a first instruction at the beginning of one processor cycle and execute a second instruction at the beginning of a next processor cycle. An instruction cycle for an instruction may be different from that of another instruction, for example, the first instruction may require 10 processor cycles and the second instruction may require only one processor cycle, hence an instruction whose execution starts later may complete the execution thereof before an instruction whose execution starts earlier, at which point the processor may continue executing subsequent instructions. Thus, the processor may execute instructions in the instruction sequence out of order.

However, when a processor processes instructions, some instructions must have a strict order of execution, that is, a next instruction can only start execution after a current instruction has completed execution, otherwise an error may occur. For example, a first instruction is to assign a variable A and a second instruction is to use the assigned variable A. The assigned variable A can only be used normally after the assignment of the variable A has been completed, hence the two instructions require a strict order of execution, that is, the execution of the second instruction can only begin after the execution of the first instruction has been completed. In the field of processors, instructions that require an order of execution include, for example, scalar load instructions, scalar store instructions, vector load instructions, vector store instructions, global memory to local memory (gm2lm) instructions, and local memory to global memory (lm2gm) instructions. In the present application, these instructions are referred to as memory instructions, while instructions other than these instructions, which do not require a strict order of execution, are referred to as non-memory instructions.

In addition, still taking the above assignment instructions as an example, after the two instructions have been written by a programmer using an advanced language, a plurality of other instructions, typically non-memory instructions, may be generated between the two instructions after they have been converted into the assembly language. Thus, in an instruction sequence after being converted into the assembly language, a large number of non-memory instructions are present between the memory instructions.

Hazardous conflicts may be said to exist in a case where two memory instructions must have a strict order of execution due to the semantics of instructions. To address the hazardous conflicts, methods used in the conventional processors include the implicit addition of appropriate halt instructions, e.g., fence instructions, in the process of compilation. The halt instruction functions like a blocker, which prevents execution of all subsequent instructions in a case where the halt instruction is executed, and resumes the execution of the subsequent instructions in a case where certain conditions are met, the conditions including, for example, the execution of a particular instruction or all instructions before the halt instruction is completed.

However, in the conventional processors, the hazardous conflicts can only be addressed by hardware since instructions stored in the cache are not visible at the software level. Furthermore, in a conventional processor, all subsequent instructions will be prevented from execution at the beginning of execution of the halt instruction, thus execution of non-memory instructions that could otherwise be executed without hazardous conflicts is also prevented, for example, there may be several, tens, hundreds, or even more non-memory instructions between the two memory instructions having hazardous conflicts. In this case, the solution efficiency for the hazardous conflict problem is low in the conventional processor, and the execution efficiency of non-memory instructions is seriously affected in a case where the hazardous conflicts are subjected to the solution.

To at least partially solve one or more of the above-mentioned and other potential problems, an embodiment of the present application proposes an instruction executing method. By using this method, in a case where an instruction sequence including memory instructions and non-memory instructions is executed sequentially and hazardous conflicts between adjacent memory instructions are going to happen, cooperation between hardware and software is made possible, to continue execution of a large number of non-memory instructions between the two memory instructions having the hazardous conflicts. Therefore, the overall performance of the processor can be improved while ensuring programming correctness and usability, the efficiency of executing instructions by using a processor by a user and the user experience are accordingly improved, and the popularization of the artificial intelligence processor can be facilitated.

FIG. 1 is a schematic diagram of an instruction executing system 100 in which instruction executing methods according to some exemplary embodiments of the present application may be implemented. As shown in FIG. 1, the instruction executing system 100 may include a global memory 110, a direct memory access unit (DMA) 120, and a processor core 130. It should be noted that the instruction executing system 100 is extensible in that more processor cores 130 may be included, and even more global memories 110 and DMAs 120 may be included. For simplicity of illustration, only one global memory 110, one DMA 120, and one processor core 130 are shown in FIG. 1. It should be noted that the instruction executing system 100 may be any instruction executing system that makes memory content in a memory visible and manageable at a software level, such as an artificial intelligence memory system that uses the scratchpad memory.

The processor core 130 shown in FIG. 1 may include a scalar module 131, a vector module 132, a global memory module 133, a crossbar 134, and a local memory 135. The crossbar 134 controls data interaction with the local memory 135, the scalar module 131, the vector module 132, and the global memory module 133. The global memory module 133 performs data interaction with the global memory 110 through the DMA 120.

The scalar module 131 may include a hazardous process component 131-1, a scalar load component 131-2, and a scalar store component 131-3. The scalar load component 131-2 is used to handle loading of scalar instructions, the scalar store component 131-3 is used to handle storage of scalar instructions, and the hazardous process component 131-1 is used to handle hazardous conflicts for scalar instructions. The scalar instructions may include, for example, scalar load instructions and scalar store instructions.

The vector module 132 may include a hazardous process component 132-1, a vector load component 132-2, and a vector store component 132-3. The vector load component 132-2 is used to handle loading of vector instructions, the vector store component 132-3 is used to handle storage of vector instructions, and the hazardous process component 132-1 is used to handle hazardous conflicts for vector instructions. The vector instructions may include, for example, vector load instructions and vector store instructions.

The global memory module 133 may include a global memory load component 133-1 and a global memory store component 133-2. The global memory load component 133-1 is used to handle loading of global memory instructions, and the global memory store component 133-2 is used to handle storage of global memory instructions. The global memory instructions may include, for example, global memory to local memory instructions and local memory to global memory instructions.

According to the embodiments of the present application, the instruction executing system 100 may also include a controller configured for controlling the instruction executing system 100 to perform various operations.

According to the embodiments of the present application, in the instruction executing system 100, memory instructions such as scalar load instructions, scalar store instructions, vector load instructions, vector store instructions, global memory to local memory instructions and local memory to global memory instructions may be executed using different hardware queues, with memory order consistency and program order consistency among respective hardware queues being maintained.

Figure 2:
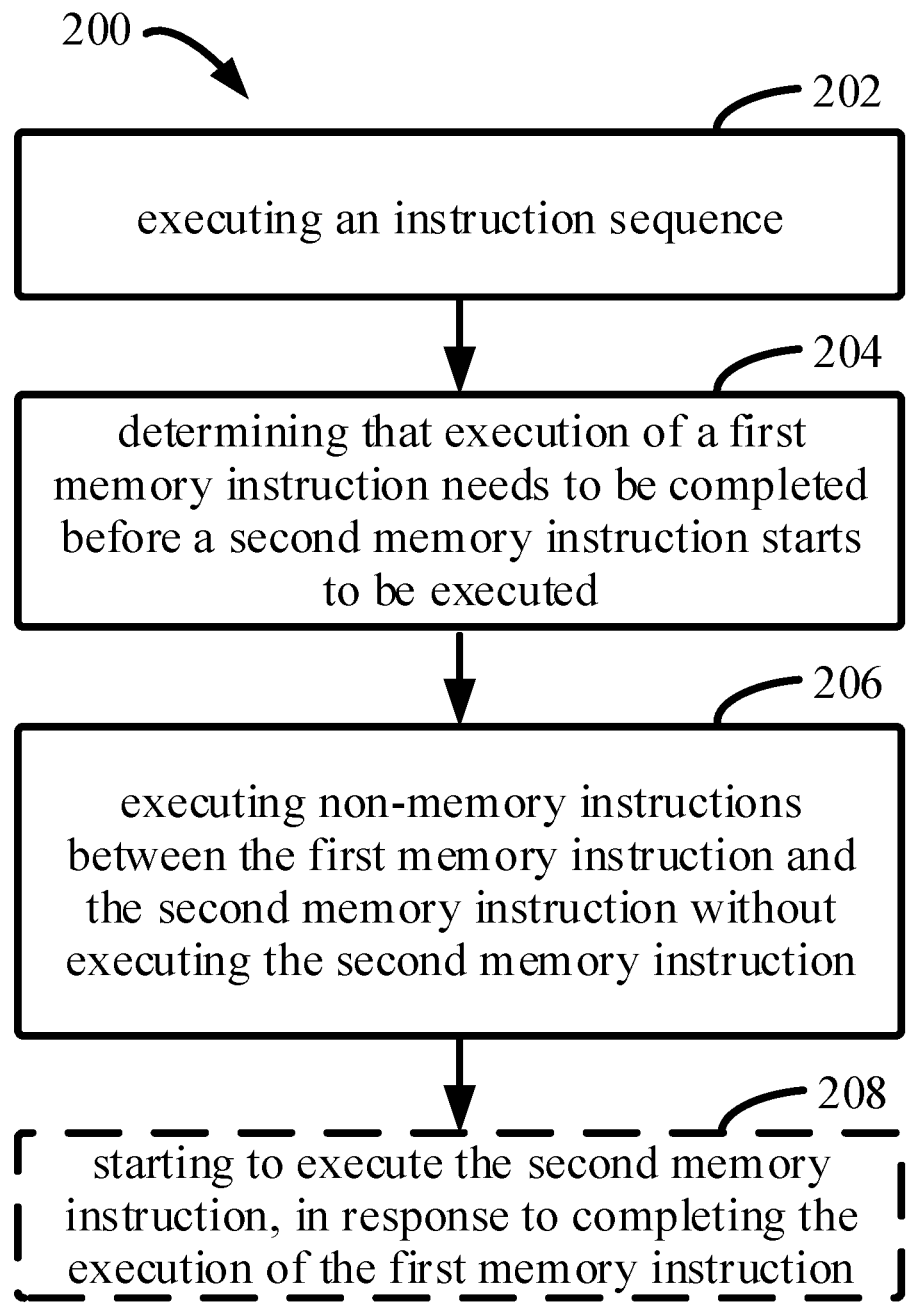
FIG. 2 is a flowchart of an instruction executing method 200 according to an embodiment of the present application.

FIG. 2 is a flowchart of an instruction executing method 200 according to an embodiment of the present application. In particular, the instruction executing method 200 may be performed by the instruction executing system 100. It should be understood that the instruction executing method 200 may also include additional operations not shown and/or the illustrated operations may be omitted, and the scope of the present application is not limited in this respect.

At block 202, the instruction executing system 100 executes an instruction sequence. According to the embodiment of the present application, the instruction sequence may include memory instructions and non-memory instructions as described above, and the instruction executing system 100 starts executing each instruction in the order of instructions in the instruction sequence.

At block 204, the instruction executing system 100 determines that execution of a first memory instruction needs to be completed before a second memory instruction starts to be executed. According to an embodiment of the present application, the second memory instruction is the next memory instruction following the first memory instruction in the instruction sequence.

According to some embodiments of the present application, the instruction executing system 100 may determine that execution of the first memory instruction needs to be completed before the second memory instruction starts to be executed, in a case where the first memory instruction is executed, since there is a sequential order in the execution of the instructions. According to further embodiments of the present application, the instruction executing system 100 may also determine that execution of a first memory instruction needs to be completed before a second memory instruction starts to be executed, in a case where the execution of the first memory instruction has not begun yet.

In the field of artificial intelligence processors, not all hazardous conflicts can be discovered by software. For example, for certain operations where the memory operation granularity of memory instructions is of a size of a memory row, hazardous conflicts between loading and storage within one subsystem (e.g., the scalar module 131 and the vector module 132) are handled by hardware, and these memory instructions are included between scalar load instructions, between scalar store instructions, between vector load instructions, and between vector store instructions. Because these hazardous conflicts are not visible to the software, they cannot be handled by the software.

However, since processing by software is more efficient and convenient, in the embodiment according to the present application, the hazardous conflicts are first handled by software, and then may be handled by hardware in a case where the hazardous conflicts cannot be discovered and handled by the software because they are not visible to the software.

Therefore, according to some embodiments of the present application, the instruction executing system 100 may determine that the execution of the first memory instruction needs to be completed before the second memory instruction starts to be executed, on the basis of types of the first memory instruction and the second memory instruction. Such situations may include, for example, certain operations where the memory operation granularity is of a size of a memory row, such as hazardous conflicts between scalar load instructions, between scalar store instructions, between vector load instructions, and between vector store instructions. At this point, that the execution of the first memory instruction needs to be completed before the second memory instruction starts to be executed may be determined by hardware for executing the instruction sequence.

For instruction conflicts that can be handled by software, a programmer can add specifically defined halt instructions into the instruction sequence so that the software can know that hazardous conflicts will occur, because the programmer is aware of possible hazardous conflicts in the process of writing the instruction sequence.

According to an embodiment of the present application, the halt instruction is included in the instruction sequence, thus the instruction executing system 100 may determine a memory instruction associated with the halt instruction as the first memory instruction, in a case where the halt instruction is executed, and further determine that the execution of the first memory instruction needs to be completed before the second memory instruction starts to be executed. According to some embodiments of the present application, the halt instruction may follow immediately a certain memory instruction, thereby indicating that the closest memory instruction before the halt instruction is the first memory instruction. According to further embodiments of the present application, the halt instruction may immediately precede a certain memory instruction, thereby indicating that the closest memory instruction following the halt instruction is the first memory instruction. At this point, that the execution of the first memory instruction needs to be completed before the second memory instruction starts to be executed may be determined by software. According to an embodiment of the present application, hazardous conflicts handled by software may include, for example, hazardous conflicts between different subsystems, such as hazardous conflicts among the scalar module 131, the vector module 132, and the global memory module 133. The hazardous conflicts handled by software may also include operations where the memory operation granularity of memory instructions is of a size of a plurality of memory rows, such as hazardous conflicts between the global memory load component and the global memory store component within the global memory module 133.

At block 206, the instruction executing system 100 executes non-memory instructions between the first memory instruction and the second memory instruction without executing the second memory instruction, during a cycle of executing the first memory instruction.

Through the operations in blocks 202, 204, and 206, efficient discovery of hazardous conflicts can be achieved, and a large number of non-memory instructions are executed without executing memory instructions that would result in hazardous conflicts, in a case where the hazardous conflicts exist, so that the processing efficiency of hazardous conflicts and the processing efficiency of the instruction sequence can be improved.

By utilizing the technology provided by the present application, the overall performance of a processor can be improved while ensuring programming correctness and usability, thereby facilitating the popularization of artificial intelligence processors.

The instruction executing method 200 may also include an optional block 208 shown in FIG. 2 in the form of a dashed box. At the optional block 208, the instruction executing system 100 starts to execute the second memory instruction, in response to completing the execution of the first memory instruction.

The operation process of the halt instruction according to an embodiment of the present application is described below by taking a specially defined fence instruction as an example of the halt instruction according to the embodiment of the present application.

For example, the instruction sequence is as follows: gm2lm→fence→add, r0, r1, r2→load r3, lm→add, r0, r1, r2→ . . . . In this instruction sequence, gm2lm is the first memory instruction, load is the second memory instruction, and fence is the halt instruction. In a case where the fence instruction is executed, the software already knows that gm2lm is the first memory instruction, and that execution of gm2lm should be completed before load starts to be executed. According to processing of conventional processors, execution of all instructions following fence is stopped at this point. However, in this example according to the embodiment of the present application, the instruction add, r0, r1, r2 between the fence instruction and the load instruction will be still executed normally. After the execution of the gm2lm instruction is completed, the software notifies the hardware of continuing the execution of the load instruction.

The instruction executing system 100 in which the instruction executing methods according to some exemplary embodiments of the present application may be implemented as well as related contents for the instruction executing method 200 according to the embodiments of the present application are described above with reference to FIGS. 1 and 2. It should be understood that the foregoing descriptions are intended to better illustrate what are described in the present application, and are not intended to be limiting in any way.

It should be understood that the number of various elements and the magnitude of various physical quantities adopted in the above respective drawings of the present application are merely illustrative, and are not intended to limit the scope of the present application. The above number and magnitude may be arbitrarily set as required, without affecting normal implementation of the embodiments of the present application.

The details of the instruction executing methods according to the embodiments of the present application have been described above with reference to FIGS. 1 and 2. Hereinafter, various modules in an instruction executing apparatus will be described with reference to FIG. 3.

Figure 3:
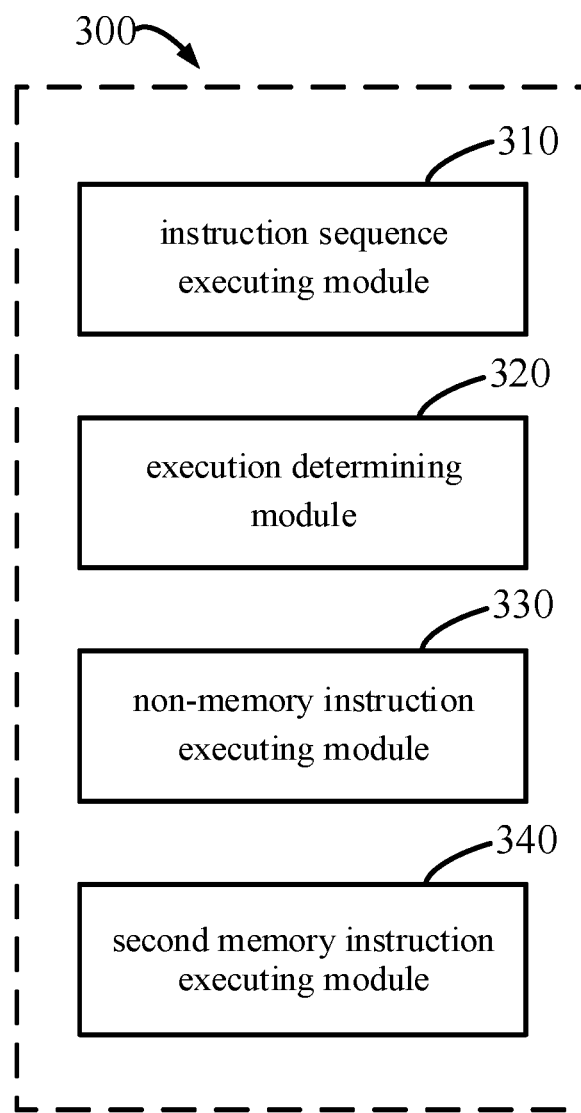
FIG. 3 is a schematic block diagram of an instruction executing apparatus 300 according to an embodiment of the present application.

FIG. 3 is a schematic block diagram of an instruction executing apparatus 300 according to an embodiment of the present application. As shown in FIG. 3, the instruction executing apparatus 300 may include: an instruction sequence executing module 310 configured for executing an instruction sequence, the instruction sequence including memory instructions and non-memory instructions, the instructions in the instruction sequence starting to be executed in order; an execution determining module 320 configured for determining that execution of a first memory instruction needs to be completed before a second memory instruction starts to be executed, the second memory instruction being a next memory instruction following the first memory instruction in the instruction sequence; and a non-memory instruction executing module 330 configured for executing non-memory instructions between the first memory instruction and the second memory instruction without executing the second memory instruction, during a cycle of executing the first memory instruction.

In some embodiments, the execution determining module 320 may include a first execution determining module (not shown) configured for determining that the execution of the first memory instruction needs to be completed before the second memory instruction starts to be executed, in a case where the first memory instruction is executed.

In some embodiments, the execution determining module 320 may include a second execution determining module (not shown) configured for determining that the execution of the first memory instruction needs to be completed before the second memory instruction starts to be executed, on the basis of types of the first memory instruction and the second memory instruction.

In some embodiments, the second execution determining module may be configured for determining, by hardware for executing the instruction sequence, that the execution of the first memory instruction needs to be completed before the second memory instruction starts to be executed.

In some embodiments, the instruction sequence may further include the halt instruction, and the execution determining module 320 may include: a first memory instruction determining module (not shown) configured for determining a memory instruction associated with the halt instruction as the first memory instruction, in a case where the halt instruction is executed; and a third execution determining module (not shown) configured for determining that the execution of the first memory instruction needs to be completed before the second memory instruction starts to be executed.

In some embodiments, the third execution determining module is configured for determining, by software, that the execution of the first memory instruction needs to be completed before the second memory instruction starts to be executed.

In some embodiments, the instruction executing apparatus 300 may further include an optional second memory instruction executing module 340 (shown as a dashed box in FIG. 3) configured for starting to execute the second memory instruction, in response to completing the execution of the first memory instruction.

According to embodiments of the present application, the present application also provides an electronic device and a computer-readable storage medium.

Through the above descriptions with reference to FIGS. 1 to 3, the technical solutions according to the embodiments of the present application have many advantages over conventional solutions. For example, by utilizing the above technical solutions, a large number of non-memory instructions between two memory instructions having hazardous conflicts can still be executed in a case where the hazardous conflicts of the memory instructions are processed, so that the overall performance of the processor can be improved while ensuring the programming correctness and usability, the efficiency of executing instructions by using a processor by a user and the user experience are accordingly improved, and the popularization of the artificial intelligence processor can be facilitated. Moreover, by utilizing the above technical solutions, the hazardous conflicts of memory instructions can be processed by hardware and software cooperatively rather than only by hardware, so that the efficiency of processing the hazardous conflicts of memory instructions can be further improved.

Figure 4:
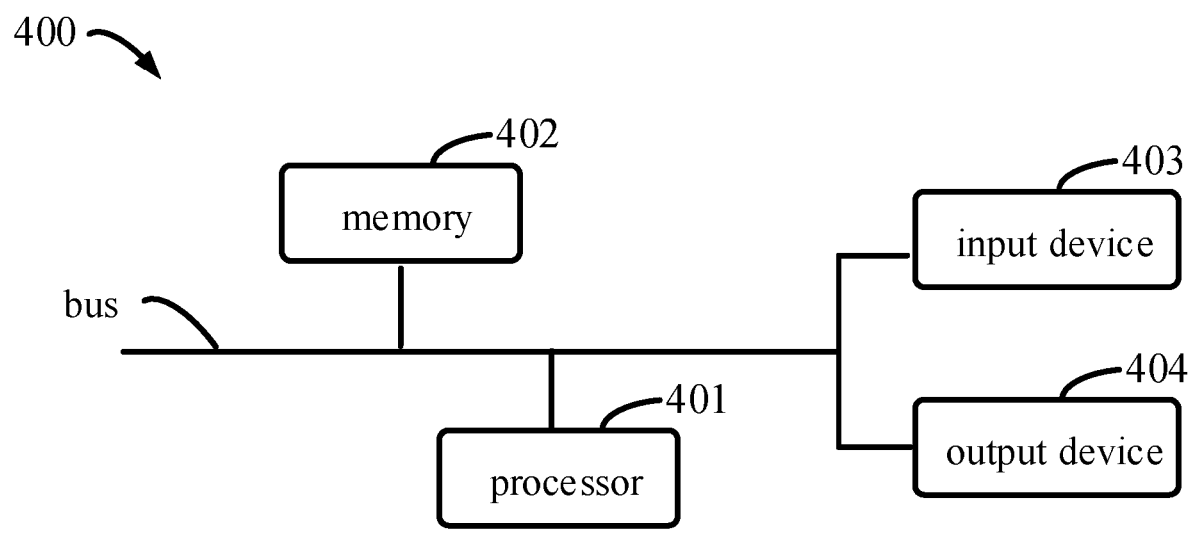
FIG. 4 is a schematic block diagram of an electronic device 400 according to an embodiment of the present application.

FIG. 4 shows a schematic block diagram of an electronic device 400 according to an embodiment of the present application. For example, the instruction executing system 100 shown in FIG. 1 and the instruction executing apparatus 300 shown in FIG. 3 may be implemented by the electronic device 400. The electronic device 400 is intended to represent various forms of digital computers, such as laptop computers, desktop computers, workstations, personal digital assistants, servers, blade servers, mainframe computers, and other suitable computers. The electronic device 400 may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 4, the electronic device 400 may include one or more processors 401, a memory 402, and interfaces for connecting the respective components, including high-speed interfaces and low-speed interfaces. The respective components are interconnected by different buses and may be mounted on a common main-board or otherwise as desired. The processor may process instructions executed within the electronic device 400, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices 400 may be connected, each providing some of the necessary operations (e.g., as an array of servers, a set of blade servers, or a multiprocessor system). An example of one processor 401 is shown in FIG. 4.

The memory 402 is a non-transitory computer-readable storage medium provided herein. The memory stores instructions executable by at least one processor to cause the at least one processor to perform the instruction executing method provided herein. The non-transitory computer-readable storage medium of the present application stores computer instructions for causing a computer to perform the instruction executing method provided herein.

The memory 402, as a non-transitory computer-readable storage medium, may be configured to store non-transitory software programs, non-transitory computer executable programs and modules, such as program instructions/modules corresponding to the instruction executing method in the embodiments of the present application (e.g., the instruction sequence executing module 310, the execution determining module 320, and the non-memory instruction executing module 330 shown in FIG. 3). The processor 401 executes various functional applications and data processing of the electronic device by running the non-transitory software programs, instructions and modules stored in the memory 402, that is, implements the instruction executing method in the above method embodiments.

The memory 402 may include a program storage area and a data storage area, wherein the program storage area may store an operating system, and an application program required for at least one function; and the data storage area may store data created according to the use of the electronic device 400, etc. In addition, the memory 402 may include a high speed random access memory, and may also include a non-transitory memory, such as at least one disk storage device, a flash memory device, or other non-transitory solid state storage devices. In some embodiments, the memory 402 may optionally include a memory remotely located with respect to the processor 401, which may be connected, via a network, to the electronic device 400. Examples of such networks may include, but are not limited to, the Internet, an intranet, a local area network, a mobile communication network and combinations thereof.

The electronic device 400 may further include an input device 403 and an output device 404. The processor 401, the memory 402, the input device 403 and the output device 404 may be connected by a bus or other means, exemplified by a bus connection in FIG. 4.

The input device 403 may receive input numeric or character information, and generate a key signal input related to a user setting and a functional control of the electronic device 400. For example, the input device may be a touch screen, a keypad, a mouse, a track pad, a touch pad, a pointer stick, one or more mouse buttons, a track ball, a joystick, and other input devices. The output device 404 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

According to the technical solutions of the embodiments of the present application, in a case where an instruction sequence including memory instructions and non-memory instructions is executed sequentially and hazardous conflicts between adjacent memory instructions are going to happen, cooperation between hardware and software is made possible, to continue execution of a large number of non-memory instructions between the two memory instructions having the hazardous conflicts. Therefore, the overall performance (e.g., processing speed and instruction executing efficiency) of the processor can be improved while ensuring programming correctness and usability, the efficiency of executing instructions by using a processor by a user and the user experience are accordingly improved, and the popularization of the artificial intelligence processor can be facilitated.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. An instruction executing method, comprising:
   executing an instruction sequence, the instruction sequence comprising memory instructions and non-memory instructions, wherein the instructions in the instruction sequence are initially executed in order;
   determining that execution of a first memory instruction needs to be completed before a second memory instruction starts to be executed, the second memory instruction being a next memory instruction following the first memory instruction in the instruction sequence; and
   executing non-memory instructions between the first memory instruction and the second memory instruction, before executing the second memory instruction and during execution of the first memory instruction;
   wherein, the instruction sequence further comprises a halt instruction, and
   in a case where the halt instruction is executed, determining a memory instruction corresponding to the halt instruction is the first memory instruction;
   wherein, the halt instruction immediately follows the first memory instruction, and in a case where the halt instruction is executed, the execution of the first memory instruction needs to be completed before the second memory instruction starts to be executed;

wherein, in a case where the halt instruction is executed, non-memory instructions between the halt instruction and the second memory instruction are executed.

2. The method according to claim 1, wherein, the determining that the execution of the first memory instruction needs to be completed before the second memory instruction starts to be executed, comprises:
determining that the execution of the first memory instruction needs to be completed before the second memory instruction starts to be executed, in a case where the first memory instruction is executed.

3. The method according to claim 1, wherein, the determining that the execution of the first memory instruction needs to be completed before the second memory instruction starts to be executed, comprises:
determining that the execution of the first memory instruction needs to be completed before the second memory instruction starts to be executed, on the basis of types of the first memory instruction and the second memory instruction.

4. The method according to claim 3, wherein, that the execution of the first memory instruction needs to be completed before the second memory instruction starts to be executed is determined by hardware for executing the instruction sequence.

5. The method according to claim 1, further comprising:
starting to execute the second memory instruction, in response to completing the execution of the first memory instruction.

6. An instruction executing apparatus, comprising:
a processor and a memory for storing one or more computer programs executable by the processor,
wherein when executing at least one of the computer programs, the processor is configured to perform operations comprising:
executing an instruction sequence, the instruction sequence comprising memory instructions and non-memory instructions, wherein the instructions in the instruction sequence are initially executed in order;
determining that execution of a first memory instruction needs to be completed before a second memory instruction starts to be executed, the second memory instruction being a next memory instruction following the first memory instruction in the instruction sequence; and
executing non-memory instructions between the first memory instruction and the second memory instruction, before executing the second memory instruction and during execution of the first memory instruction;
wherein, the instruction sequence further comprises a halt instruction, and
in a case where the halt instruction is executed, determining a memory instruction corresponding to the halt instruction is the first memory instruction;
wherein, the halt instruction immediately follows the first memory instruction, and in a case where the halt instruction is executed, the execution of the first memory instruction needs to be completed before the second memory instruction starts to be executed;
wherein, in a case where the halt instruction is executed, non-memory instructions between the halt instruction and the second memory instruction are executed.

7. The apparatus according to claim 6, wherein, when executing at least one of the computer programs, the processor is configured to further perform operations comprising:
determining that the execution of the first memory instruction needs to be completed before the second memory instruction starts to be executed, in a case where the first memory instruction is executed.

8. The apparatus according to claim 6, wherein, when executing at least one of the computer programs, the processor is configured to further perform operations comprising:
determining that the execution of the first memory instruction needs to be completed before the second memory instruction starts to be executed, on the basis of types of the first memory instruction and the second memory instruction.

9. The apparatus according to claim 8, wherein, when executing at least one of the computer programs, the processor is configured to further perform operations comprising: determining, by hardware for executing the instruction sequence, that the execution of the first memory instruction needs to be completed before the second memory instruction starts to be executed.

10. The apparatus according to claim 6, wherein, when executing at least one of the computer programs, the processor is configured to further perform operations comprising:
starting to execute the second memory instruction, in response to completing the execution of the first memory instruction.

11. A non-transitory computer-readable storage medium storing computer instructions, wherein the computer instructions cause a computer to perform the method according to claim 1.

12. A non-transitory computer-readable storage medium storing computer instructions, wherein the computer instructions cause a computer to perform the method according to claim 2.

13. A non-transitory computer-readable storage medium storing computer instructions, wherein the computer instructions cause a computer to perform the method according to claim 3.

14. A non-transitory computer-readable storage medium storing computer instructions, wherein the computer instructions cause a computer to perform the method according to claim 4.

* * * * *